Figure 1:
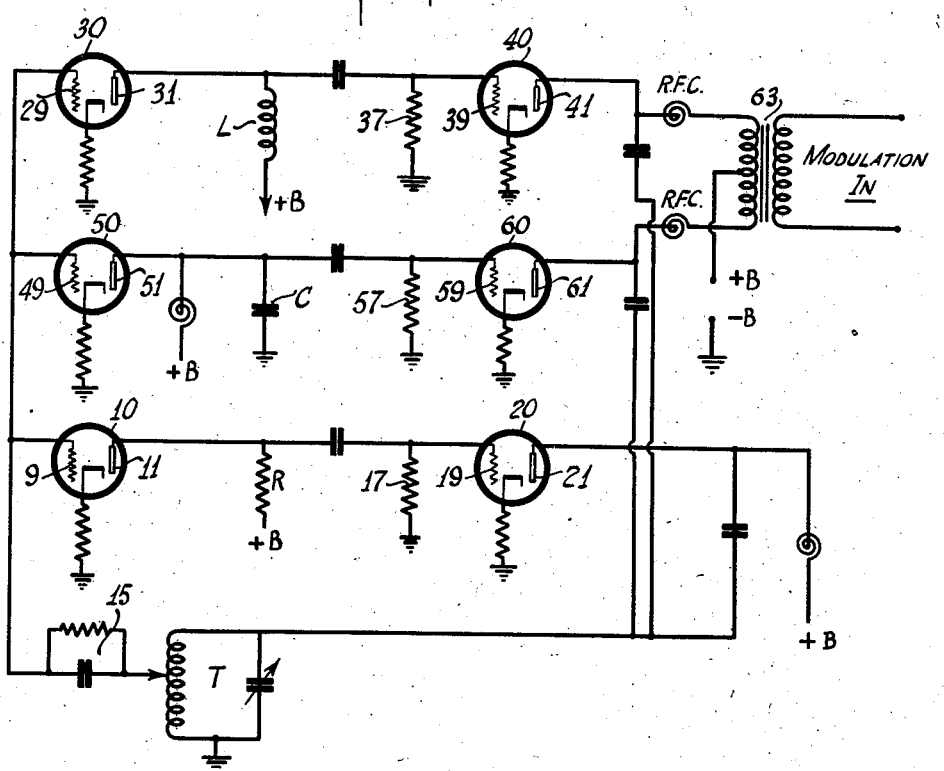

March 20, 1945.  W. VAN B. ROBERTS  2,372,012

WAVE LENGTH MODULATION

Filed Oct. 12, 1942

INVENTOR
Walter van B. Roberts.
BY H. S. Grover
ATTORNEY

Patented Mar. 20, 1945

2,372,012

UNITED STATES PATENT OFFICE 2,372,012

WAVE LENGTH MODULATION

Walter van B. Roberts, Princeton, N. J., assignor to Radio Corporation of America, a corporation of Delaware Application October 12, 1942, Serial No. 461,719

5 Claims. (Cl. 179—171.5)

This application concerns a new and improved timing or wave length modulation system. By the expression "timing or wave length modulation" applicant means a system wherein the instantaneous frequency of wave energy is controlled in accordance with signals or control potentials. This control or modulation may be as to phase or frequency or modified forms of either or both depending on the treatment of the potentials used to control the instantaneous frequency of the wave energy.

In describing my invention, reference will be made to the drawing, wherein Figures 1 and 2 each shows a modification of a wave length modulation system arranged in accordance with my invention.

In Figure 1 T is a tank circuit, a point on which is coupled to the grids 9, 29, and 49 of tubes 10, 30 and 50. The tank circuit is grounded at one end and it is also coupled by radio-frequency coupling condensers to the anodes 21, 41 and 51 of tubes 20, 40 and 60. Tube 10 has its anode 11 coupled by a circuit including resistance R and a coupling condenser to the grid 19 of tube 20. Tube 30 has its anode 31 coupled by a circuit including inductance L and a coupling condenser to the grid of tube 40. Tube 50 has its anode 51 coupled by a circuit including a capacitive reactance C and a coupling condenser to the grid 59 of tube 60.

The direct current bias circuit for tubes 10, 30 and 50 include a grid leak and condenser arrangement 15. The direct-current bias circuits for the grids of tubes 20, 40 and 60 include resistors 17, 37 and 57. The cathodes of the several tubes may be connected to ground directly or by resistances where additional bias is desired.

The anodes of tubes 40 and 60 are also connected through radio-frequency chokes RFC to the secondary winding of a transformer 63, the primary winding of which is connected to a source of control potentials of the desired nature.

The couplings between tubes 10 and 20 including resistance R are such as to produce negative conductance through the tubes 10 and 20 and across the tank circuit so that considering these tubes as amplifiers, oscillations are produced therein and in the tank circuit of a frequency determined primarily by the tuning of the tank circuit T. It will be understood that for high-frequency operation the element R will be a network of a type well known in the art of broad band amplifiers for producing the effect of a pure resistance over a band of frequencies.

Tubes 30 and 40 are coupled by an inductive reactance circuit including L so that the said tubes with their couplings produce susceptance across the tank circuit C.

Tubes 50 and 60 are coupled by a reactive coupling C of sign opposite to that in the coupling between tubes 30 and 40 so that they provide therein and across the tank circuit T susceptance of a sign opposite to the susceptance provided by tubes 30 and 40 across the tank circuit T. The gain of the amplifiers 30 and 40 and 50 and 60 are made equal in the absence of modulation so that they are equal and offset each other normally so that the system operates to produce oscillations of a frequency equal to the natural frequency of the tank circuit T.

When modulation potential is applied differentially to the anodes 41 and 61 of tubes 40 and 60, that is, the tubes in the two susceptance producing networks, the net susceptance will become positive or negative according to the polarity of the modulation voltage and oscillations will be modulated in frequency. There will be no amplitude modulation because no modulation is applied to the negative conductance producing system including tubes 10 and 20. While plate modulation has been mentioned, this is for the purpose of specific illustration as other types of modulation can be used also.

Figure 2:
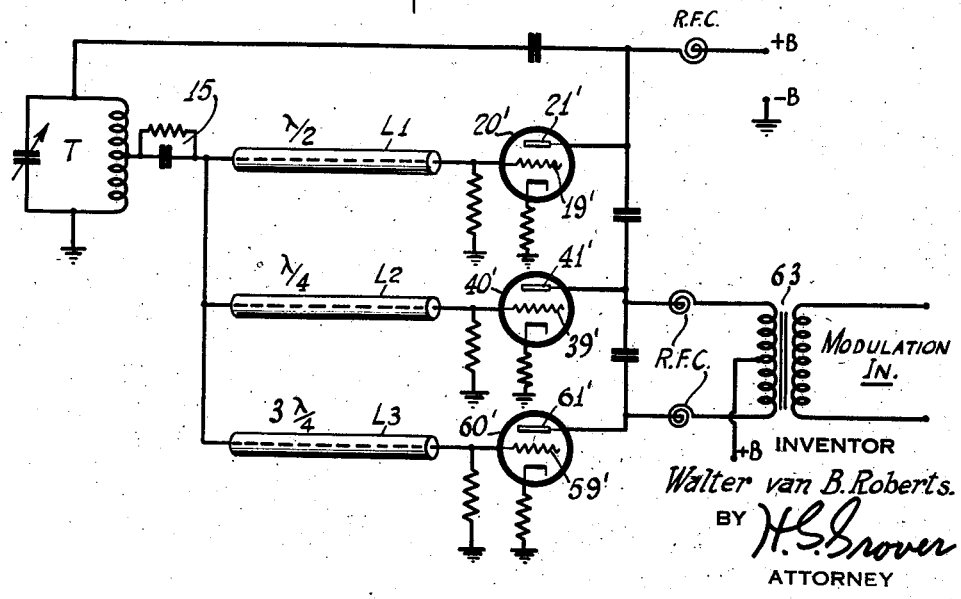

In the modification of Figure 2, three tubes 20', 40', and 60' have their anodes 21', 41', and 61' coupled, as shown, to the tank circuit T. The tube 20' has its control grid 19' coupled to a point on the tank circuit T by a concentric line L and a grid biasing arrangement 15. L is of a length of the order of λ/2. The control grid 39' of tube 40' is connected through 15 to the tank circuit by a line L2, the length of which is of the order of Nλ/4. The control grid 59' of tube 60' is coupled through 15 to the tank circuit T by a line N3λ/4 in length, where N is a whole odd number.

The modification of Figure 2 operates in principle the same as the modification in Figure 1 except that a single tube is included in the negative conductance network and made to supply negative conductance across the tank T by virtue of the phase reversing action of the half wave length line L. The susceptance supplying networks include single tubes 40' and 60' having their control electrodes coupled to the tank circuit T by concentric lines L2 and L3, of which L1 is of a ¼ wave length, while L2 is of a length substantially equal to ¾ of a wave length. One of these lines, say L2, provides susceptance of one sign, while the other of these lines, say L1, provides susceptance of an opposite sign. Here, as in Figure 1, in the event tubes 40' and 60' have equal gains, the susceptances of opposite sign compensate or neutralize each other and oscillations of a frequency equal to the natural frequency of tube T are generated.

However, when modulation is applied differentially to the tubes 40' and 60', one susceptance increases and the other decreases so that the net susceptance across the tank circuit becomes positive or negative according to the polarity of the modulation potentials applied to the anodes. Here, as in Figure 1, there will be no amplitude modulation because no modulation potential is applied to the negative conductance system, including tube 20' and line L.

What is claimed is:

1. A wave length modulation system comprising a tank circuit, an amplifier coupled to said tank circuit and operated to produce thereacross a negative conductance, a second amplifier coupled to said tank circuit and operated to produce thereacross positive susceptance, a third amplifier coupled to said tank circuit and operated to produce thereacross negative susceptance substantially equal to said positive susceptance and connections for differentially controlling the amplification of said second and third amplifiers in accordance with control potentials.

2. A wave length modulation system comprising a tank circuit, a tube amplifier coupled across said tank circuit and operated to produce thereacross a negative conductance, a second tube amplifier coupled across said tank circuit and operated to produce thereacross positive susceptance, a third tube amplifier coupled across said tank circuit and operated to produce thereacross negative susceptance substantially equal to said positive susceptance and connections for differentially controlling the amplification of said second and third amplifiers in accordance with control potentials.

3. A wave length modulation system comprising a tank circuit, an amplifier coupled across said tank circuit by a line the length of which is about λ/2 to produce across said tank circuit a negative conductance, a second amplifier coupled across said tank circuit by a line the length of which is less than λ/2 to produce across said tank a positive susceptance, a third amplifier coupled across said tank circuit by a line the length of which is more than λ/2 to produce a negative susceptance and connections for differentially controlling the amplification of said second and third amplifiers in accordance with control potentials.

4. In a wave length modulation system, a tank circuit, a first pair of electron discharge devices, each having input and output electrodes, a coupling between the input electrodes of one of said discharge devices and said tank circuit, a coupling between the output electrodes of the other of said discharge devices and the tank circuit, a resistive coupling between the output electrodes of the first of said discharge devices and the input electrodes of the second of said pair of discharge devices, a second pair of electron discharge devices each having input electrodes and output electrodes, an inductive coupling between the output electrodes of one of said devices of said second pair and the input electrodes of the other device of said second pair, a coupling between the input electrode of said one of said devices of said second pair and the tank circuit, a coupling between the output electrodes of the other of said devices of said second pair and the tank circuit, a third pair of electron discharge devices each having input and output electrodes, a capacitive coupling between the output electrodes of one of said devices of the third pair and the input electrodes of the other of the devices of the third pair, a coupling between the input electrodes of said one of said devices of the third pair and the tank circuit, a coupling between the output electrodes of the other of said devices of the third pair and the tank circuit and means for differentially modulating the amplification of at least one device of said second and third named pairs of devices differentially in accordance with control potentials.

5. In a wave length modulation system, a tank circuit, an amplifier having an input and an output with its input coupled to its output by said tank circuit and operated to produce through said amplifier and in the tank circuit negative conductance, a second amplifier having an input and an output with its input coupled to its output by said tank circuit and operated to produce through said second amplifier and in said tank circuit positive susceptance, a third amplifier having an input and an output with its input coupled to its output by said tank circuit and operated to produce through said third amplifier and in said tank circuit negative susceptance substantially equal to said positive susceptance, and connections for differentially controlling the amplification of said second and said third amplifiers in accordance with control potentials.

WALTER van B. ROBERTS.